3,162,622
TRIFLUOROMETHYL VINYL ETHER AND ITS POLYMERS

Paul E. Aldrich, Wilmington, Del., assignor to E. I. du Pont de Nemours and Company, Wilmington, Del., a corporation of Delaware
No Drawing. Filed Oct. 23, 1961, Ser. No. 147,080
16 Claims. (Cl. 260—87.5)

This invention relates to, and has as its principal objects provision of, trifluoromethyl vinyl ether, polymers and cured polymers of this monomer, manufactures made from the polymers, and methods for preparing all of the same.

According to the monomer aspect of the present invention, the new and useful compound trifluoromethyl vinyl ether, $CF_3$—O—$CH=CH_2$, is prepared by dehydrohalogenation of a 2-chloro- (or 2-bromo-) ethyl trifluoromethyl ether by means of an alkali metal hydroxide. The dehydrohalogenation is conveniently carried out by contacting the 2-chloro- (or 2-bromo-) ethyl trifluoromethyl ether with at least an equimolar quantity of an alkali metal hydroxide, e.g., potassium hydroxide. While the use of an inert reaction medium is not essential in this dehydrohalogenation process, it is preferred that one be employed. Absolute ethyl alcohol or denatured alcohol are suitable as they dissolve the alkali metal hydroxide and the dehydrohalogenation is conveniently carried out at the reflux temperature of the mixture. A dispersion of powdered alkali metal hydroxide in a high boiling hydrocarbon can also be employed.

The dehydrohalogenation takes place over a wide range of temperature but temperatures of 50–80° C. are very satisfactory. While either 2-chloroethyl or 2-bromoethyl trifluoromethyl ether can be employed in this process, the bromoderivative is preferred because of the greater ease of separation of the desired product from the by-product vinyl halide. When 2-bromoethyl trifluoromethyl ether is employed, the trifluoromethyl vinyl ether is conveniently isolated from the reaction mixture by fractional distillation. The trifluoromethyl vinyl ether can be separated from by-product vinyl chloride by preparative gas chromatography if a pure sample of the product is desired.

The 2-chloroethyl and 2-bromoethyl trifluoromethyl ether starting materials for the dehydrohalogenation process can be prepared by known methods. For example, 2-chloroethanol or 2-bromoethanol can be heated at 100–125° C. with carbonyl fluoride and the reaction product, after removal of excess carbonyl fluoride, can then be treated with sulfur tetrafluoride at temperatures of 100–175° C. The reaction mixture is then treated with a slurry of powdered sodium fluoride in xylene and the filtrate is distilled to obtain the 2-haloethyl trifluoromethyl ether.

Monomeric trifluoromethyl vinyl ether forms polymers with the general ultimate utilities of such materials. These polymers, which may be either homopolymers or copolymers of the trifluoromethyl vinyl ether with one or more other ethylenically unsaturated monomers, preferably containing at least 5% by weight of the trifluoromethyl vinyl ether, accordingly, represent the polymer aspect of the invention.

Homopolymerization of trifluoromethyl vinyl ether can be effected in various ways, for example, by bulk, solution or emulsion methods in the presence of free radical liberating initiators. Polymerization is generally carried out in the normal fashion in containers constructed of materials inert to the reactants, e.g., glass, platinum or the alloy known commercially as "Hastelloy." Dinitrogen difluoride ($N_2F_2$) is a suitable initiator for polymerizing trifluoromethyl vinyl ether in bulk. With this initiator, temperatures ranging from 70° to 75° C. and pressures ranging from 6 to 3000 atmospheres are suitable. Pressure has little effect on the polymerization of this monomer.

The ether can be polymerized in solution in inert solvents, e.g., benzene, by means of a peroxide initiator, e.g., benzoyl peroxide, at temperatures of about 85° C. under autogenous pressure in inert reaction vessels, e.g., vessels constructed of platinum.

Emulsion polymerization of trifluoromethyl vinyl ether can be carried out in inert containers by means of ammonium persulfate as the initiator at temperatures of about 60–85° C.

Copolymerization of trifluoromethyl vinyl ether with one or more other copolymerizable ethylenically unsaturated monomers is accomplished in accordance with this invention by bulk or solution methods in the presence of free radical liberating initiators. Thus, trifluoromethyl vinyl ether can be copolymerized with tetrafluoroethylene in hexafluoropropylene dimer as a solvent and dintirogen difluoride as the initiator, or in a solvent such as octafluoro-1,4-dithiane. The bulk polymerization of trifluoromethyl vinyl ether with other ethylenically unsaturated compounds, e.g., hexafluoropropylene, can be accomplished with dinitrogen difluoride as initiator. Emulsion copolymerization between trifluoromethyl vinyl ether and other ethylenically unsaturated monomers, e.g., tetrafluoroethylene, can be carried out in the same manner as emulsion homopolymerization.

The proportions of comonomers in the final copolymer are dependent on the particular comonomers being employed. For example, with tetrafluorethylene as a comonomer, the proportions of the recurring units derived from the two monomers is about the same in the polymer as in the mixture of comonomers employed as starting material. With ethylene, the proportion of trifluoromethyl vinyl ether units is higher in the polymer than in the mixture of monomers employed.

Polymers of trifluoromethyl vinyl ether can be cured by treatment with a beam of electrons or by heating with a peroxide, e.g., tert.-butyl peroxide or benzoyl peroxide, or by heating with an amine salt, e.g., at a temperature of about 100–200° C.

There follow some nonlimiting examples which illustrate the products and processes of this invention. In these examples all pressures are ambient atmospheric and all proportions of ingredients are expressed in parts by weight unless otherwise stated. The preparation of the monomer of the invention is shown in Examples I and II.

EXAMPLE I

*Dehydrochlorination of 2-Chloroethyl Trifluoromethyl Ether*

A. A glass reaction vessel having three necks is fitted with a reflux condenser, a dropping funnel and a magnetic stirrer. Provision for collecting gaseous products is made by connecting the top of the condenser to a trap cooled by a mixture of acetone and solid carbon dioxide. The vessel is charged with 56 g. (1 mole) of potassium hydroxide in 210 ml. of 2B denatured alcohol. The reaction vessel is heated until the alcohol refluxes and there is then added dropwise, during a period of 60 minutes, 36.6 g. (0.246 mole) of 2-chloroethyl trifluoromethyl ether. At the end of the reaction, there is 15–16 ml. of condensate in the cold trap. Distillation of this material in a low temperature still gives 18.8 g. of crude trifluoromethyl vinyl ether boiling at −18° to −14° C. Analysis of this product by vapor phase chromatography shows that it is a mixture of two components in the ratio 76:24. The retention time of the smaller peak is in agreement with that of an authentic sample of vinyl chloride (B.P. −12° C.). Elemental analysis of the mixture shows that it contains 10.55% fluorine. On the assumption that the mixture is free of other impurities, this fluorine analysis indicates that the ratio of trifluoromethyl vinyl ether and vinyl chloride in the mixture is 71:29. An analytical sample of trifluoromethyl vinyl ether is separated from the mixture by preparative gas chromatography.

*Anal.* Calc'd for $C_3H_3F_3O$: F, 50.87%. Found: F, 50.91%.

The 2-chloroethyl trifluoromethyl ether used as the starting material in this sample may be prepared as follows: A pressure vessel constructed of the corrosion-resistant alloy known commercially as "Hastelloy" and having a capacity of 145 ml. is charged with 61.2 g. (0.762 mole) of 2-chloroethanol and 75 g. (1.14 moles) of carbonyl fluoride. The mixture is heated at 100° C. for 1 hour and 125° C. for 2 hours. The reactor is cooled to room temperature and vented to remove excess carbonyl fluoride. The reactor is then closed and 90 g. (0.833 mole) of sulfur tetrafluoride is added and the mixture is heated at 100° C., 150° C. and 175° C. for 2 hours at each temperature. The reactor is cooled to room temperature and vented. The product remaining in the reactor is cautiously stirred into a slurry of 90 g. of powdered sodium fluoride in xylene. The mixture is filtered and the filtrate is distilled. There is obtained 48 g. of 2-chloroethyl trifluoromethyl ether, boiling at 62–65° C. and having a refractive index, $n_D^{25}$, of 1.3292. The fluorine and proton nuclear magnetic resonance spectra are consistent with the assigned structure.

*Anal.* Calc'd for $C_3H_4ClF_3O$: C, 24.26%; H, 2.71%; Cl, 23.87%; F, 38.80%. Found: C, 24.50%; H, 2.72%; Cl, 23.80%; F, 38.58%.

B. A mixture of 32 g. of 2-chloroethyl trifluoromethyl ether and 30 ml. of absolute ethyl alcohol is heated to reflux in a reaction vessel of the type described above. To this mixture is added in a slow but steady stream a solution of 18 g. of 85% potassium hydroxide in 120 ml. of absolute ethyl alcohol during a period of about 20 minutes. After the addition is completed the mixture is heated at reflux for another 30 minutes. The crude product is transferred by distillation directly from the trap to a receiver, 10 g. of distillate being obtained. This contains trifluoromethyl vinyl ether and can be used without further purification for subsequent reactions.

EXAMPLE II

*Dehydrobromination of 2-Bromoethyl Trifluoromethyl Ether*

A reaction vessel of the type described in Example I is charged with a mixture of 56 g. of potassium hydroxide and 210 ml. of 2B denatured alcohol. The mixture is heated to reflux and 41.3 g. (0.214 mole) of 2-bromoethyl trifluoromethyl ether (prepared from 2-bromoethanol by the procedure described above for the preparation of the 2-chloroethyl derivative) is added over a period of 60 minutes. The condensate collected in the cold trap is distilled in a low temperature still and there is obtained 15 g. (63% of theory) of trifluoromethyl vinyl ether, B.P. −18° to −15° C. Gas chromatography of this product indicates that it is 98% pure.

Examples III–VII show homopolymerization of trifluoromethyl vinyl ether effected with dinitrogen dinitrofluoride.

EXAMPLE III

A platinum tube is charged with 30 ml. of gaseous trifluoromethyl vinyl ether and 1.5 ml. of gaseous dinitrogen difluoride and then sealed. The tube is heated at 70° C. for 4 hours under an external pressure of 1000 lb./sq. in. After the tube is cooled and opened, there is obtained a polymer of trifluoromethyl vinyl ether in the form of a viscous oil.

EXAMPLE IV

A platinum tube is charged with 300 ml. of gaseous trifluoromethyl vinyl ether and 5 mg. of dinitrogen difluoride and then sealed. The tube is heated at 75° C. for 4 hours under an external pressure of 3000 atmospheres. A white, elastic polymer of trifluoromethyl vinyl ether is obtained. The polymer is soluble in ether and acetone; is slightly soluble in methanol; and is insoluble in water and toluene. The inherent viscosity of a 0.1% acetone solution of the polymer at 25° C. is 0.16.

EXAMPLES V–VII

Three 9 mm. by 15 cm. platinum tubes are each charged with 1.5 g. of trifluoromethyl vinyl ether and the quantity of dinitrogen difluoride initiator indicated in the following Table I. The closed tubes are heated at 75° C. for 4 hours under the pressures indicated in the table. The yields of polymer obtained and the inherent viscostiy of each polymer are also listed in the table.

TABLE I.—POLYMERIZATION OF TRIFLUOROMETHYL VINYL ETHER

| Example No. | $N_2F_2$, mg. | External Pressure, atm. | Yield of Polymer g. (percent) | Inherent Viscosity of Polymer [1] |
|---|---|---|---|---|
| V | 15.0 | 3,000 | 1.18 (79) | 0.06 |
| VI | 1.5 | 3,000 | 1.21 (87) | 0.58 |
| VII | 0.15 | 100 | 0.14 (9) | 3.31 |

[1] Measured at 0.1% concentration in acetone at 25° C.

The polymers obtained are clear, colorless to yellow solids that are tacky and somewhat elastomeric. They are generally soluble in oxygenated organic solvents, e.g., acetone, ethyl acetate, diethyl ether, etc. Acetone is an especially good solvent. The nuclear magnetic resonance spectra obtained on these polymers dissolved in acetone show a single fluorine resonance peak consistent with the $CF_3O$ group.

*Anal.* Calc'd for $C_3H_3F_3O$: C, 32.16%; H, 2.70%. Found: C, 32.45%; H, 2.70%.

Example VIII shows the homopolymerization of trifluoromethyl vinyl ether with a peroxide initiator.

EXAMPLE VIII

A 9-mm. by 15 cm. platinum tube is charged with 10 mg. of benzoyl peroxide, 1 ml. of benzene, and 1 g. of trifluoromethyl vinyl ether. The tube is sealed and heated at 85° C. for 16 hours under 100 atmospheres external pressure. When the tube is opened, there is obtained 0.96 g. of a sticky, soft, solid polymer.

Examples IX–XVIII show copolymerization of trifluoromethyl vinyl ether and at least one other ethylenically unsaturated compound.

EXAMPLE IX

A platinum tube of the type used in the preceding experiments is charged with 1.5 g. of trifluoromethyl vinyl ether, 1.5 g. of tetrafluoroethylene, 2 ml. of gaseous dinitrogen difluoride and 2 ml. of the saturated dimer of hexafluoropropylene (as solvent). The tube is sealed and heated at 75° C. for 4 hours under an external pressure of 100 atmospheres. There is obtained 2.18 g. of sticky, soft, solid polymer with properties similar to trifluoromethyl vinyl ether homopolymer. The nuclear magnetic resonance spectrum of the copolymer in acetone solution shows a fluorine peak corresponding closely in position to the trifluoromethoxy fluorine peak of the trifluoromethyl vinyl ether homopolymer. Two other closely adjacent peaks are also present and they are of nearly equal area. The polymer is entirely soluble in acetone and this indicates it is not a mixture of homopolymers. Elemental analysis (fluorine, 62.04%) of the polymer indicates it to be a copolymer consisting of 52.7% of units derived from trifluoromethyl vinyl ether and 47.3% of units derived from tetrafluoroethylene.

EXAMPLE X

A platinum tube is charged with 1.23 g. of tetrafluoroethylene, 1.37 g. of trifluoromethyl vinyl ether, 1.7 mg. of dinitrogen difluoride and 1 ml. of octafluoro-1,4-dithiane (as solvent). The tube is sealed and heated at 75° C. for 4 hours under an external pressure of 100 atmospheres. There is obtained, after evaporation of the solvent, 1.36 g. (99%) of a white solid with the appearance of polytetrafluoroethylene. A film of this polymer pressed at 175° C. and $10^4$ lb./sq. in. pressure exhibits an infrared absorption spectrum having a small band at 3.3 microns indicative of C-H absorption and very strong absorption from 7.6 to 9.0 microns indicative of C-F bonds. The polymer is insoluble in common solvents such as water, methanol, acetone, acetonitrile, ether, toluene, and hexane. Elemental analysis (C, 24.97%; H, 0.56%; F, 74.08%) indicates that the ratio of trifluoromethyl vinyl ether to tetrafluoroethylene is approximately 1:10.

EXAMPLE XI

A platinum tube is charged with 7 mg. of ammonium persulfate and 1 ml. of water. The tube is cooled in liquid nitrogen and 300 ml. each of gaseous trifluoromethyl vinyl ether and tetrafluoroethylene are condensed in the tube. The tube is evacuated (to exclude oxygen) and sealed. The tube is heated at 85° C. for 16 hours with shaking and under sufficient external pressure (about 100 atmospheres of nitrogen) to prevent rupture of the tube. At the end of this time, the tube is cooled and the product is removed, washed with distilled water and dried. There is obtained 0.92 g. (45% of theory) of an elastomeric polymer. Elemental analysis of the polymer shows it to contain 60.55% fluorine, a value indicating that the polymer contains trifluoromethyl vinyl ether and tetrafluoroethylene units in the ratio of 60:40.

EXAMPLE XII

A platinum tube is charged with 1.5 g. of trifluoromethyl vinyl ether, 1.5 g. of hexafluoropropylene and 2 ml. of gaseous dinitrogen difluoride. The tube is sealed and heated at 75° C. for 4 hours under an external pressure of 3000 atmospheres. The resulting polymer is found by elemental analysis to contain 28.05% carbon and 2.16% hydrogen. This indicates that the product is a copolymer consisting of 57% trifluoromethyl vinyl ether units and 43% hexafluoropropylene units. This copolymer is tacky and soluble in acetone. It possesses an inherent viscosity of 1.05 (determined at 0.1% concentration in acetone at 25° C.). This copolymer has properties similar to those of trifluoromethyl vinyl ether homopolymer.

EXAMPLE XIII

A stainless steel reaction vessel capable of withstanding high pressures and having a capacity of 200 ml. is charged with 70 mg. of azodiisobutyronitrile; a solution of 0.5 g. of sodium sulfite, 1.18 g. of dipotassium phosphate and 0.45 g. of monopotassium phosphate in 120 ml. of deoxygenated water; 5.0 g. of trifluoromethyl vinyl ether and 20 g. of ethylene. The vessel is subjected to a pressure of 1300 atmospheres by water injection and is heated at 65° C. After 3.5 hours' heating, the pressure decreases by 505 atmospheres. After the reaction vessel is cooled to room temperature, it is opened and the resulting white solid is removed and reduced mechanically to small particles. The product is then washed in water and dried in an oven at 80° C. There is obtained 12.0 g. of a white solid which can be pressed into a film at 125° C. and 10,000 lb./sq. in. pressure. The resulting film is translucent and more rubbery than polyethylene. Elemental analysis of the polymer shows that it contains 67.86% carbon and 10.97% hydrogen. On the basis of the carbon content the copolymer contains 11.0 mole percent of trifluoromethyl vinyl ether. The presence of the trifluoromethyl group in the polymer is indicated by a C-F absorption band at 7.9 microns in the infrared absorption spectrum of the pressed film.

EXAMPLE XIV

A platinum tube is charged with 1 ml. of water, 5 drops of an emulsifier solution consisting of a 10% (weight/volume) solution of $CF_3CF_2CF_2OCF(CF_3)CF_2OCF(CF_3)COONH_4$ in water, and 7 mg. of ammonium persulfate. The tube is cooled in liquid nitrogen and 300 ml. of vinylidene fluoride and 300 ml. of trifluoromethyl vinyl ether (both measured at 1 atmosphere) are condensed in the tube. The evacuated tube is sealed and heated with shaking under an external pressure of 100 atmospheres at 85° C. for 16 hours. The tube is cooled in liquid nitrogen and opened by cutting and then warmed to room temperature. There is obtained from the tube 0.18 g. of a sticky copolymer of trifluoromethyl vinyl ether and vinylidene fluoride. Elemental analysis of the copoylmer shows that it contains 34.54% C. and 5.32% H. This indicates that the mole percent of trifluoromethyl vinyl ether in the copolymer is 41%.

EXAMPLE XV

A platinum tube is charged with 5 mg. of ammonium persulfate, 1 ml. of deoxygenated water, 1.4 g. of trifluoromethyl vinyl ether and 0.80 g. of vinyl chloride (uninhibited). The tube is sealed with careful exclusion of air and is heated at 85° C. for 16 hours. The tube is opened and the polymer (total weight 0.18 g.) is found to consist partly of a yellow solid and partly of a white foam. Analysis of the yellow solid (Cl, 40.09%; F, 11.66%) and of the white foam (Cl, 41.02%; F, 12.58%) indicates the presence of both vinyl chloride and trifluoromethyl vinyl ether units. On the basis of chlorine analysis the copolymer contains approximately 59% vinyl chloride units.

EXAMPLES XVI–XVIII

A reaction vessel of 1 liter capacity, capable of withstanding high pressures and fitted with a mechanical stirrer, is charged with 300 g. of vinyl fluoride, 16.5 g. of trifluoromethyl vinyl ether, 500 g. of deionized water and 0.5 g. of α,α'-azobis(isobutyramidine hydrochloride). The reaction mixture is heated at 80° C. under 4000 lb./sq. in. gauge pressure for 15 minutes. After cooling the reactor, there is isolated 64 g. of a solid copolymer of vinyl fluoride and trifluoromethyl vinyl ether. This copolymer has an inherent viscosity (measured at 0.1% concentration in hexamethylene phosphoramide at 30° C.) of 2.01, and has a fusion temperature (temperature of coagulation of a mineral oil suspension of the polymer) of 185° C.

Similar results are obtained when the procedure of Example XVI is repeated with 10.0 (Example XVII) and 3.0 g. (Example XVIII) of trifluoromethyl vinyl ether, respectively. In these cases the fusion temperatures of the copolymers obtained are 187° and 189° C. and the inherent viscosities are 1.76 and 1.93, respectively. The corresponding values for a vinyl fluoride homopolymer prepared under the same conditions are: fusion temperature, 191° C. and inherent viscosity, 2.00. The increasing infrared absorption at 7.87 microns and the decreasing fusion temperatures observed on this series of copolymers with increasing amounts of trifluoromethyl vinyl ether in the monomer charge show that copolymerization of the two monomers has taken place.

Clear films are obtained from the copolymers of each of Examples XVI (16.5 g. of trifluoromethyl vinyl ether), XVII (10.0 g.) and XVIII (3.0 g.) by casting 40% solids organosols in dimethylformamide onto smooth glass plates, doctoring the casting to a thickness of about 15 mils and then subjecting the casting to radiant heat exposure to coalesce the polymer particles. The plate-andfilm assembly is quenched in cold water and the film is stripped from the plate and clamped in a suitable frame. Residual dimethylformamide is removed by heating in a current of warm air.

The following physical property characterization of the solvent-free films set forth in Table II below is obtained. Bi-directional properties are obtained in both directions but averages only are recorded.

TABLE II

| Physical Property | Example XVI | Example XVII | Example XVIII |
|---|---|---|---|
| Thickness, mils | 2.4 | 3.4 | 2.6 |
| Tensile Strength, lb./sq. in | 4,700 | 4,800 | 4,900 |
| Elongation, percent | 40 | 67 | 69 |
| Tensile Modulus, lb./sq. in | 234,000 | 233,000 | 239,000 |
| Elmendorf Tear Strength, grams/mil | 50 | 59 | 53 |
| Pneumatic Impact Strength, kg. cm./mil | 1.33 | 1.45 | 1.22 |

EXAMPLE XIX

*Emulsion Homopolymerization of Trifluoromethyl Vinyl Ether*

A "Hastelloy–C" pressure vessel of 400 ml. of capacity is charged with 1 part of ammonium persulfate, 2 parts of disodium hydrogen phosphate heptahydrate, 0.2 part of sodium sulfite, 0.15 part of ammonium perfluorooctanoate and 200 parts of deoxygenated water under a nitrogen atmosphere. The vessel is closed under nitrogen, cooled near −80° C. and evacuated. Thirteen parts of trifluoromethyl vinyl ether is then added by distillation. The vessel is closed, maintained at 60° C. for 2 hours, cooled to room temperature and vented. The addition of aqueous sodium chloride to the slightly turbid latex affords 7 parts (54% yield) of elastomeric polymer having an inherent viscosity of 0.24 (0.1% in acetone at 25° C.).

EXAMPLE XX

*Emulsion Copolymerization of Trifluoromethyl Vinyl Ether and Tetrafluoroethylene*

The "Hastelloy–C" pressure vessel is charged as in Example XIX, cooled near −80° C. and evacuated. Twenty-three parts of trifluoromethyl vinyl ether and 11 parts of tetrafluoroethylene are distilled into the vessel and the vessel closed and maintained at 60° C. for 2 hours. The vessel is cooled to room temperature and vented to obtain a slightly opaque polymer latex. This latex is combined with that obtained from 24 parts of trifluoromethyl vinyl ether and 7 parts of tetrafluoroethylene obtained by the same procedure. The addition of aqueous sodium chloride to the combined latex precipitates the copolymer which is washed with water and with methanol and then air dried to obtain 62 parts (95% yield) of white elastomer. This raw copolymer can be milled on conventional rubber mills and can be pressed at 100° C. to a rubbery, slightly opaque film. Elemental analysis of the polymer (fluorine, 57.2%) indicates it to be a copolymer consisting of 73% of units derived from trifluoromethyl vinyl ether and 27% of units derived from tetrafluoroethylene, in agreement with the relative amounts of the two monomers charged.

Trifluoromethyl vinyl ether polymers can be cured by treatment with electrons or by heating in the presence of peroxides or amine salts. Such curing is illustrated by Examples XXI–XXV.

EXAMPLE XXI

A film of trifluoromethyl vinyl ether polymer is placed between two aluminum sheets and is irradiated at room temperature in an electron beam (2 × 10⁶ volts) for a total exposure of 250 watt-sec./cm.² The resulting film is still tacky but when stretched it does not flow as the uncured polymer film does. The material is no longer completely soluble in acetone.

EXAMPLE XXII

A solution of 1.8 g. of trifluoromethyl vinyl ether polymer and 0.2 g. of tert.-butyl peroxide in 20 ml. of acetone is prepared and this is evaporated on a steam bath. A portion of the residue is pressed between two pieces of aluminum foil at 200° C. and 10,000 lb./sq. in. for 20 minutes. The polymeric material is scraped from the aluminum foil and slurried in acetone. Crosslinking of the trifluoromethyl vinyl ether polymer is evident by the partial insolubility of the product in acetone.

EXAMPLE XXIII

The substitution of benzoyl peroxide for tert.-butyl peroxdie in the process described in Example XXII gives similar results.

EXAMPLE XXIV

One gram of a tetrafluoroethylene-trifluoromethyl vinyl ether copolymer (consisting of 60 mole percent of trifluoromethyl vinyl ether) is stirred into a mixture of 20 ml. of acetone and 10 ml. of ethyl acetate and there are then added 15 mg. of hexamethylenediamine carbamate and 150 mg. of magnesium oxide powder. This mixture is then allowed to stand at room temperature for 24 hours after which the solvents are evaporated by warming the stirred mixture under a stream of nitrogen. The residue is pressed several times at 85° C. to aid the removal of solvent and is finally pressed at 150° C. under 5000 lb./sq. in. pressure. The resulting product is a crosslinked copolymer as shown by its greatly decreased solubility in acetone and ethyl acetate.

EXAMPLE XXV

The procedure of Example XXIV is repeated with the exception that 40 mg. of cumene peroxide is substituted for hexamethylenediamine carbamate and magnesium oxide powder. As in Example XXIV, the resulting product is a vulcanized copolymer of trifluoromethyl vinyl ether and tetrafluoroethylene. The cured product has decreased solubility in acetone and ethyl acetate.

In addition to the copolymers of trifluoromethyl vinyl ether with ethylene, vinylidene fluoride, vinyl fluoride, vinyl chloride, tetrafluoroethylene and hexafluoropropylene illustrated in the examples, the polymers of this invention include copolymers of trifluoromethyl vinyl ether with other polymerizable ethylenically unsaturated monomers. Specific examples of other copolymers include copolymers containing at least 5% recurring units derived from trifluoromethyl vinyl ether with 5 to 95% of one or more recurring units derived from one or more of the following ethylenically unsaturated monomers: propylene, 1,3-butadiene, chloroprene, fluoroprene, chlorotrifluoroethylene, and vinylidene chloride. Copolymers of trifluoromethyl vinyl ether with olefins and haloolefins are a preferred group of the polymers of this invention.

The homopolymers of trifluoromethyl vinyl ether and copolymers with one or more other ethylenically unsaturated monomers of the same are useful for various purposes. The polymers are, for example, employed in the formulation of coating compositions for application to paper, wood, metal and the like, and for the preparation of self-supporting films that are elastomeric. The utility of the trifluoromethyl vinyl ether polymers is illustrated more specifically below (see also the examples above and Table II in particular):

EXAMPLE A

A square of plate glass is sprinkled with pieces of trifluoromethyl vinyl ether homopolymer (e.g., a polymer prepared as described in Example VII). Another square of plate glass is laid on top and the assembly is heated overnight in an oven at 80° C. The assembly is allowed to cool to room temperature and it is found that the pieces of plate glass are firmly held together by a transparent layer of the trifluoromethyl vinyl ether homopolymer.

EXAMPLE B

A 5% solution of trifluoromethyl vinyl ether homopolymer (of the type described in Example VII) in acetone is prepared. A piece of filter paper is immersed to the extent of about half its area in this solution and is then allowed to dry. The same half of the filter paper is reimmersed in the solution and again dried. A drop of water placed on the untreated portion of the filter paper is rapidly absorbed; however, a drop of water placed on the treated portion is absorbed only after long standing.

EXAMPLE C

A copolymer of trifluoromethyl vinyl ether and tetrafluoroethylene consisting of 60 mole percent of trifluoromethyl vinyl ether is pressed into a film at 135° C. and 4000 lb./sq. in. pressure. The tenacity of thin strips of this film is determined in grams/denier at 250% elongation over 5 cycles with the following results: 0.0142, 0.0115, 0.108, 0.0102, 0.00983. The tenacity at break is 0.0161 gram/denier (350% elongation).

EXAMPLE D

Several pieces of a 1:1 copolymer of trifluoromethyl vinyl ether and tetrafluoroethylene are placed between two pieces of plate glass and the assembly is heated at 135° C. in a press at 1000 lb./sq. in. pressure. The assembly is removed from the press and allowed to cool to room temperature. It is found that the glass plates are firmly held together by the film of the copolymer.

EXAMPLE E

A piece of filter paper and a film of trifluoromethyl vinyl ether-tetrafluoroethylene copolymer containing 60 mole percent of the trifluoromethyl vinyl ether are pressed together at 135° C. under 12,000 lb./sq. in. pressure. The resulting coated paper is water and oil repellent.

EXAMPLE F

A piece of filter paper and a film of trifluoromethyl vinyl ether-ethylene copolymer containing 0.11 mole percent of trifluoromethyl vinyl ether are pressed together at 135° C. under 12,000 lb./sq. in. pressure. The resulting sheet is a slick, translucent, impregnated paper which is waterproof and oil repellent.

Since obvious modifications and equivalents in the invention will be evident to those skilled in the chemical arts, I propose to be bound solely by the appended claims.

The embodiments of the invention in which an exclusive property or privilege is claimed are defined as follows:

1. Trifluoromethyl vinyl ether.
2. A homopolymer trifluoromethyl vinyl ether.
3. A copolymer of trifluoromethyl vinyl ether and at least one member of the group consisting of polymerizable olefins and haloolefins, said copolymer containing at least 5% by weight of recurring units derived from trifluoromethyl vinyl ether.
4. A copolymer of trifluoromethyl vinyl ether and tetrafluoroethylene containing at least 5% by weight of recurring units derived from trifluoromethyl vinyl ether.
5. A copolymer of trifluoromethyl vinyl ether and hexafluoropropylene containing at least 5% by weight of recurring units derived from trifluoromethyl vinyl ether.
6. A copolymer of trifluoromethyl vinyl ether and ethylene containing at least 5% by weight of recurring units derived from trifluoromethyl vinyl ether.
7. A copolymer of trifluoromethyl vinyl ether and vinylidene fluoride containing at least 5% by weight of recurring units derived from trifluoromethyl vinyl ether.
8. A copolymer of trifluoromethyl vinyl ether and vinyl fluoride containing at least 5% by weight of recurring units derived from trifluoromethyl vinyl ether.
9. A cured homopolymer of claim 2 of the group consisting of a homopolymer cured by irradiation, a homopolymer cured by a peroxide, and a homopolymer cured by an amine salt.
10. A cured copolymer of claim 3 of the group consisting of a copolymer cured by irradiation, a copolymer cured by a peroxide, and a copolymer cured by an amine salt.
11. A cured copolymer of claim 4 of the group consisting of a copolymer cured by irradiation, a copolymer cured by a peroxide, and a copolymer cured by an amine salt.
12. A self-supporting film formed from a polymer of claim 2.
13. A self-supporting film formed from a polymer of claim 3.
14. A self-supporting film formed from a polymer of claim 4.
15. A self-supporting film formed from a polymer of claim 6.
16. A self-supporting film formed from a polymer of claim 8.

References Cited in the file of this patent

UNITED STATES PATENTS

| | | |
|---|---|---|
| 2,732,370 | Codding | Jan. 24, 1956 |
| 2,820,025 | Schildknecht | Jan. 14, 1958 |
| 2,830,007 | Shukys | Apr. 8, 1958 |
| 2,872,487 | Croix | Feb. 3, 1959 |
| 2,917,548 | Dixon | Dec. 15, 1959 |
| 2,975,164 | Crawford | Mar. 14, 1961 |
| 2,991,278 | Schildknecht | July 4, 1961 |

FOREIGN PATENTS

| | | |
|---|---|---|
| 1,111,616 | Germany | July 27, 1961 |